US011504660B2

(12) United States Patent
Annamalai et al.

(10) Patent No.: US 11,504,660 B2
(45) Date of Patent: Nov. 22, 2022

(54) ENDPLATE WITH GUIDE FEATURE

(71) Applicants: CUMMINS FILTRATION IP, INC., Columbus, IN (US); DAVCO Technology, LLC, Saline, MI (US)

(72) Inventors: Manikandan Annamalai, Cookeville, TN (US); Mark Straussberger, Algood, TN (US); Jayant Singh, Pune (IN); Gregory D. Shope, Cookeville, TN (US); Zdzislaw Chajec, Saline, MI (US); Robert Polkus, Redford, MI (US); David Hipwood, Northville, MI (US)

(73) Assignees: CUMMINS FILTRATION IP, INC., Columbus, IN (US); DAVCO Technology, LLC, Saline, MI (US)

( * ) Notice: Subject to any disclaimer, the term of this patent is extended or adjusted under 35 U.S.C. 154(b) by 0 days.

(21) Appl. No.: 17/338,864

(22) Filed: Jun. 4, 2021

(65) Prior Publication Data
US 2021/0291089 A1 Sep. 23, 2021

Related U.S. Application Data

(63) Continuation of application No. 16/629,855, filed as application No. PCT/US2018/041865 on Jul. 12, 2018.

(30) Foreign Application Priority Data

Jul. 13, 2017 (IN) .............................. 201741024766

(51) Int. Cl.
*B01D 35/30* (2006.01)
*B01D 29/11* (2006.01)
(Continued)

(52) U.S. Cl.
CPC ............ *B01D 35/306* (2013.01); *B01D 29/11* (2013.01); *B01D 35/14* (2013.01);
(Continued)

(58) Field of Classification Search
CPC .................. B01D 35/306; B01D 29/58; B01D 2201/4046; B01D 2201/4053;
(Continued)

(56) References Cited

U.S. PATENT DOCUMENTS 4,278,455 A 7/1981 Nardi
5,193,579 A 3/1993 Bauer et al.
(Continued)

FOREIGN PATENT DOCUMENTS

CN 101311521 11/2008
CN 102256679 11/2011
(Continued)

OTHER PUBLICATIONS

Non-Final Office Action on U.S. Appl. No. 16/495,006 dated Jun. 9, 2021.
(Continued)

*Primary Examiner* — Benjamin M Kurtz
(74) *Attorney, Agent, or Firm* — Foley & Lardner LLP

(57) ABSTRACT

Various example embodiments relate to a filtration system. The filtration system comprises a housing having a first housing end and a second housing end. The housing defines a central compartment therein. The housing comprises a key slot disposed on the first housing end and a housing key element protruding from the first housing end toward the second housing end. The filtration system further comprises a filter element positioned within the central compartment of the housing. The filter element has a first filter end and a second filter end. The filter element includes filter media and an endplate disposed on the first filter end. The endplate (Continued)

includes a central endplate opening, a key element configured for engagement with the key slot, and an installation guidance element formed along the central endplate opening. The installation guidance element is configured for engagement with the housing key element.

7 Claims, 16 Drawing Sheets

(51) Int. Cl.
  *B01D 35/14* (2006.01)
  *B01D 46/00* (2022.01)
  *B01D 46/24* (2006.01)
(52) U.S. Cl.
  CPC ....... *B01D 46/0005* (2013.01); *B01D 46/009* (2013.01); *B01D 46/24* (2013.01); *B01D 2201/0453* (2013.01); *B01D 2201/316* (2013.01); *B01D 2201/4053* (2013.01); *B01D 2201/52* (2013.01); *B01D 2265/026* (2013.01); *B01D 2279/60* (2013.01)
(58) Field of Classification Search
  CPC ...... B01D 2201/4061; B01D 2201/291; B01D 2265/026
  See application file for complete search history.

(56) References Cited

U.S. PATENT DOCUMENTS

| | | |
|---|---|---|
| 6,478,958 B1 | 11/2002 | Beard et al. |
| 10,047,708 B2 | 8/2018 | Jiang et al. |
| 10,744,431 B2 | 8/2020 | Gustafson et al. |
| 2004/0134171 A1 | 7/2004 | Scott et al. |
| 2005/0000876 A1 | 1/2005 | Knight |
| 2009/0020465 A1 | 1/2009 | Jiang et al. |
| 2009/0071892 A1 | 3/2009 | Malgorn |
| 2009/0230063 A1 | 9/2009 | Hawkins et al. |
| 2010/0101993 A1 | 4/2010 | Wells et al. |
| 2010/0294707 A1 | 11/2010 | Abdalla et al. |
| 2011/0024344 A1 | 2/2011 | Thomas et al. |
| 2012/0018359 A1 | 1/2012 | Sann et al. |
| 2012/0024771 A1 | 2/2012 | Abdalla et al. |
| 2012/0223006 A1* | 9/2012 | Sann ...................... B01D 35/06 210/441 |
| 2012/0261326 A1 | 10/2012 | Deschamps et al. |
| 2013/0087497 A1 | 4/2013 | Wells et al. |
| 2013/0180898 A1 | 7/2013 | Chajec et al. |
| 2014/0061113 A1* | 3/2014 | Radeva-Tsanova ........................ B01D 35/153 210/236 |
| 2014/0190880 A1 | 7/2014 | Krull |
| 2016/0258397 A1 | 9/2016 | Jiang et al. |
| 2016/0296864 A1 | 10/2016 | Shimpi et al. |
| 2017/0028328 A1 | 2/2017 | Parra et al. |
| 2017/0252682 A1* | 9/2017 | Gustafson ............. B01D 29/111 |
| 2019/0262751 A1 | 8/2019 | Jainek |
| 2020/0094172 A1 | 3/2020 | Annamalai et al. |

FOREIGN PATENT DOCUMENTS

| | | |
|---|---|---|
| CN | 102648036 A | 8/2012 |
| CN | 104168973 | 11/2014 |
| CN | 105611988 A | 5/2016 |
| EP | 2 604 321 | 6/2013 |
| EP | 2 736 620 | 6/2014 |
| WO | WO-2015/042348 A | 3/2015 |
| WO | WO-2018/104416 | 6/2018 |
| WO | WO-2019/159057 | 8/2019 |
| WO | WO-2021/013417 | 1/2021 |
| WO | WO-2021/013638 | 1/2021 |
| WO | WO-2021/013647 | 1/2021 |
| WO | WO-2021/013648 | 1/2021 |
| WO | WO-2021/024091 | 2/2021 |

OTHER PUBLICATIONS

International Search Report and Written Opinion issued for PCT/US2018/023084, dated Jun. 1, 2018, 16 pages.

International Search Report and Written Opinion issued for PCT/US2018/041865, dated Sep. 27, 2018, 13 pages.

Office Action issued for U.S. Appl. No. 16/629,855, dated Nov. 10, 2021, 20 pages.

US Final Office Action issued for U.S. Appl. No. 17/339,038 dated Dec. 29, 2021, 22 pages.

Final Office Action on U.S. Appl. No. 16/629,855 dated May 2, 2022.

* cited by examiner

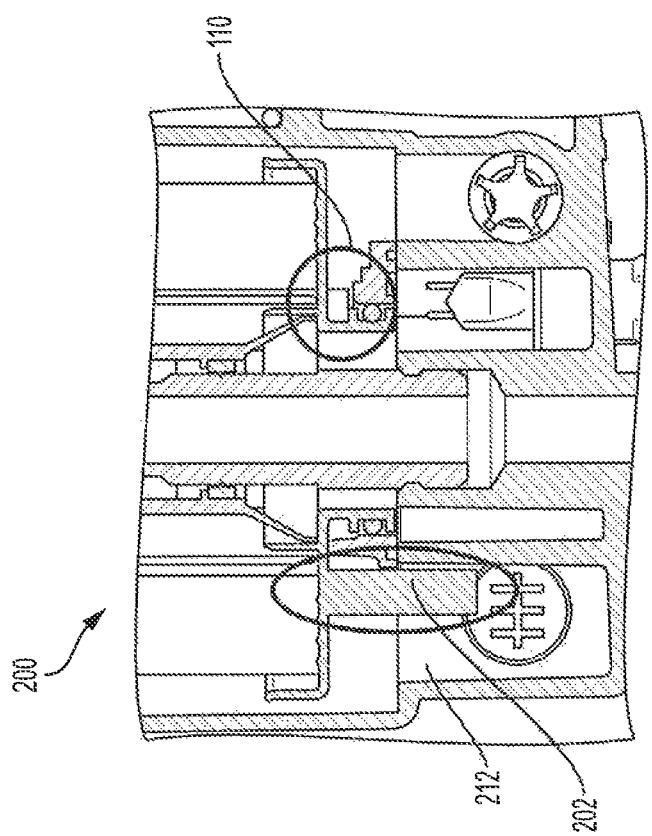
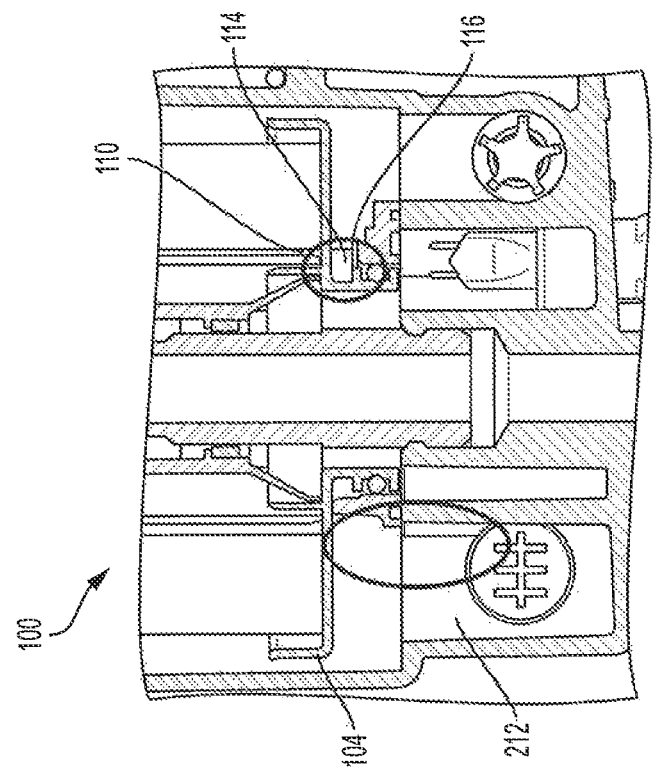
FIG. 3B
FIG. 3A

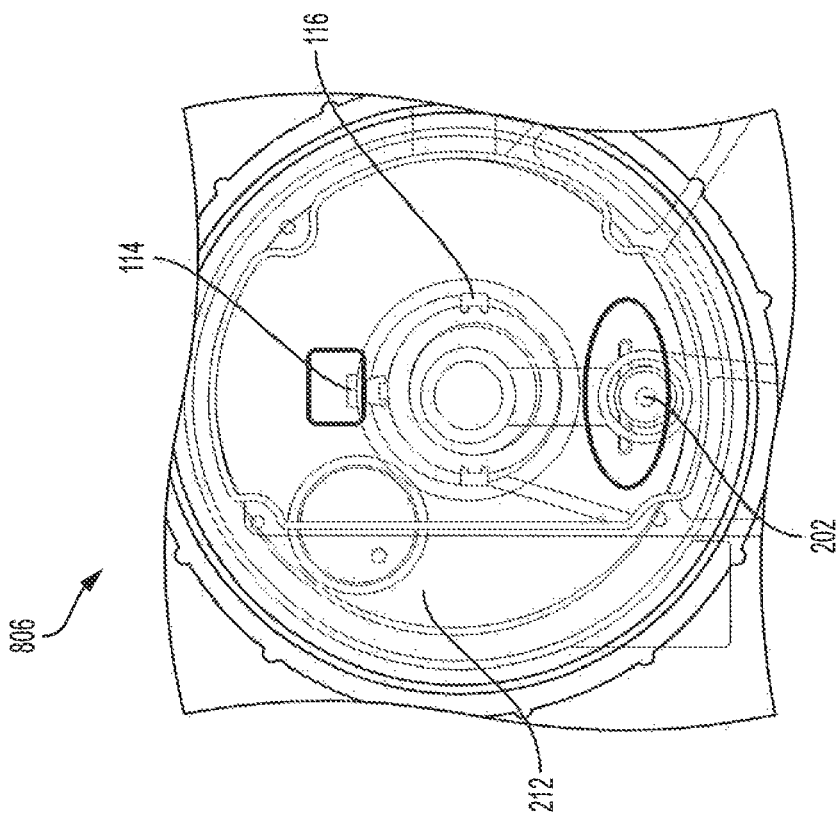
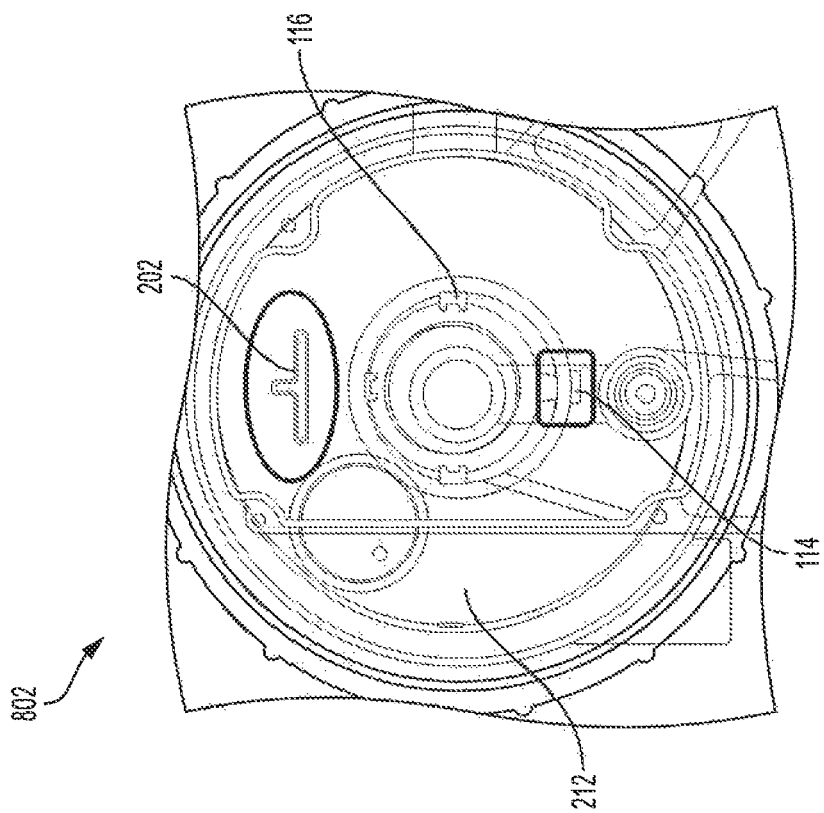

ENDPLATE WITH GUIDE FEATURE

CROSS-REFERENCE TO RELATED PATENT APPLICATION

The present application is a continuation of U.S. patent application Ser. No. 16/629,855, filed Jan. 9, 2020, which is the U.S. national stage of PCT Application No. PCT/US2018/041865, filed Jul. 12, 2018, which claims the benefit of priority to Indian Provisional Patent Application No. 201741024766, filed Jul. 13, 2017, the contents of which are incorporated herein by reference in their entireties.

TECHNICAL FIELD

The present application relates to filter elements for filtering fluids in internal combustion engine systems or the like.

BACKGROUND

Internal combustion engines generally combust a mixture of fuel (e.g., gasoline, diesel, natural gas, etc.) and air. Prior to entering the engine, the fluid (e.g., liquid, air, etc.) is typically passed through a filtration system to remove contaminants (e.g., dust, water, oil, etc.) from the fluid. The filtration system includes a filter element having filter media. As the fluid passes through the filter media of the filter element, the filter media removes at least a portion of the contaminants in the fluid, thereby preventing unwanted contaminants from entering the internal combustion engine. In some cases, unauthorized or non-genuine replacement filter elements may be installed in the filtration systems during servicing operations. The unauthorized and non-genuine replacement filter elements may be of inferior quality to genuine, authorized filter elements. Thus, the use of unauthorized or non-genuine replacement filter elements may cause damage to the engine by allowing contaminants past the filter element.

Filter elements often include a seal member that is compressed against a component of the filtration system housing or another portion of the filtration system. The seal member forms a seal between the filtration system housing and the filter element, thereby preventing fluid from bypassing the filter element (e.g., for air to bypass an air filter element or liquid to bypass a liquid filter element). The seal can be formed by, for example, a key element deposed on the filter element and a complementary key slot disposed on the housing. If an improper filter element (i.e., a non-authorized or non-genuine filter element) is installed in a filtration system, or if the proper filter element is installed incorrectly, the seal member of the filter element may not form a proper seal, and fluid may bypass the filter element causing damage to downstream components.

SUMMARY

Various example embodiments relate to a filtration system. The filtration system comprises a housing having a first housing end and a second housing end. The housing defines a central compartment therein. The housing comprises a key slot disposed on the first housing end and a housing key element protruding from the first housing end toward the second housing end. The filtration system further comprises a filter element positioned within the central compartment of the housing. The filter element has a first filter end and a second filter end. The filter element includes filter media and an endplate disposed on the first filter end. The endplate includes a central endplate opening, a key element configured for engagement with the key slot, and an installation guidance element formed along the central endplate opening. The installation guidance element is configured for engagement with the housing key element. The engagement of the first housing end and the second housing end occurs when the installation guidance element receives the housing key element. The engagement of the first housing end and the second housing end is prevented from occurring when the installation guidance element is not receiving the housing key element.

Another example embodiment relates to a filtration system. The filtration system comprises a housing having a first housing end and a second housing end. The housing defines a central compartment therein. The housing comprises a key slot disposed on the first housing end. The housing further comprises an open cavity disposed on the first housing end. The filtration system further comprises a filter element positioned within the central compartment of the housing. The filter element has a first filter end and a second filter end. The filter element includes filter media and an endplate disposed on the first filter end. The endplate comprises a key element configured for engagement with the key slot. The endplate further comprises a T-shaped installation guidance element. The T-shaped installation guidance element is configured for engagement with the open cavity when the filter element is properly installed within the housing. The T-shaped installation guidance element includes a first lateral protrusion, a second lateral protrusion, and a longitudinal protrusion. The longitudinal protrusion is perpendicular to an intersection of the first lateral protrusion and the second lateral protrusion. The engagement of the first housing end and the second housing end occurs when the T-shaped installation guidance element is disposed within the open cavity. The engagement of the first housing end and the second housing end is prevented from occurring when the T-shaped installation guidance element is not disposed within the open cavity.

Another example embodiment relates to a filtration system. The filtration system comprises a housing having a first housing end and a second housing end. The housing defines a central compartment therein. The housing comprises a key slot disposed on the first housing end. A housing key element protrudes from the second housing end toward the first housing end. The filtration system further comprises a filter element positioned within the central compartment of the housing. The filter element has a first filter end and a second filter end. The filter element includes filter media, a first endplate disposed on the first filter end, and a second endplate disposed on the second filter end. The first endplate includes a key element configured for engagement with the key slot. The second endplate includes a central endplate opening and an installation guidance element formed along the central endplate opening. The installation guidance element is configured for engagement with the housing key element. The engagement of the first housing end and the second housing end occurs when the installation guidance element receives the housing key element. The engagement of the first housing end and the second housing end is prevented from occurring when the installation guidance element is not receiving the housing key element.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 3A shows a cross-sectional, side view of a filtration system of FIGS. 1A and 1B that does not have an installation guidance element.

FIG. 3B shows a cross-sectional, side view of the filtration system including a filter element having an endplate that includes an installation guidance element of FIG. 2.

FIG. 9B shows a cross-sectional, top view of an improper installation of a filtration system including a filter element having an endplate that includes an installation guidance element shown that is improperly installed at a location of a "12 O'clock" position.

FIG. 9C shows a cross-sectional, top view of an improper installation of a filtration system including a filter element having an endplate that includes an installation guidance element shown that is improperly installed at a location of a "6 O'clock" position.

DETAILED DESCRIPTION

Figure 1B:
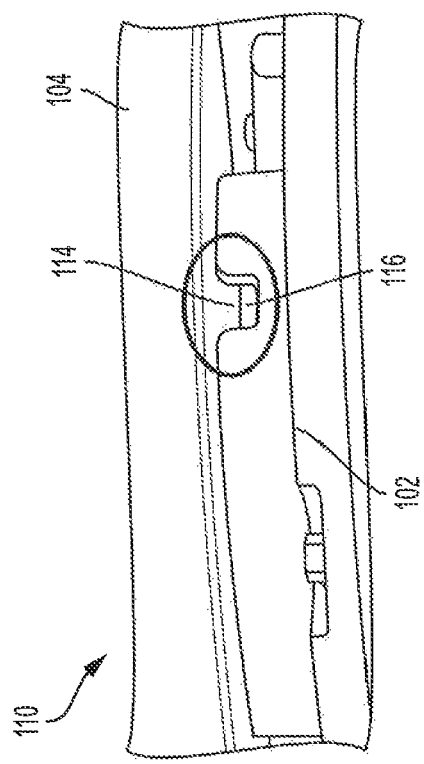
FIG. 1B shows a perspective view of the engagement of a key element of the filter element and the key slot of the housing of FIG. 1A.

Referring to the figures generally, a filtration system having a filter element with an endplate that includes an installation guidance element (for example, a T-shaped installation guidance element). The alignment of a key element on the filter element with a housing key-slot is an issue in currently available (e.g., current) filter elements. Using current filter elements, the installation of the cartridge into the housing requires a user to manually orient a key element disposed on an endplate of the filter element with a complementary key-slot element disposed on the housing. If the manual installation is not proper, then the user will need to remove the filter element and re-install. If not fixed and properly installed, there could be potential bypass leakage into other components due to the O-ring seal member being in the incorrect location or orientation. However, many current filter elements can be improperly installed and still be closed with a cover and used, consequently, the user would have no indication of the proper installation prior to leakage, damage, or decrease in the quality of the product.

According to various embodiments, a filter element is therefore provided that includes an endplate with an installation guidance element to provide ease of proper installation, avoid potential bypass issues, ensure quality of the product, provide discernable improper installations, reduce assembly time (by the manufacturer throughout the process to an end user), increase productivity, reduces product cost, reduce total cost of/for ownership for customer and ensures quality product, assist with "blind" assembly of the filter element in the housing, and provide other related benefits.

Generally, the installation guidance element can be of any configuration, including variations in the shape of the installation guidance element, size of the installation guidance element, and number of installation guidance elements disposed on the endplate. The installation guidance element is configured to have a shape, length, width, and number of elements that is specifically tailored to interface with a housing. This ensures that the assembly of the filter element and housing is successful only when the filter element and housing are properly aligned (e.g., sealed).

In some arrangements, the installation guidance element comprises a rib formed in a "T" shape and referred to herein as a "T-Rib." The T-Rib is structured to act as poke yoke, guiding the user to properly align the key element in key slot properly. The T-Rib is disposed on a first end surface of the endplate of the filter element. The T-Rib is structured to ensure that it will only go through open cavity spot within housing. In some arrangements, the T-Rib extends away from the filter media. In some arrangements, the T-Rib includes a protrusion that is "T" shaped having two lateral protrusions being longer than the one longitudinal protrusions. In some arrangements, the T-Rib is formed on the endplate. In other arrangements, the T-Rib is coupled to the endplate. In some arrangements, the T-Rib is located 180° opposite the key element on the end plate and the key slot on the housing. The endplate includes an inner throat disposed on the first end of the endplate and is offset and includes an O-ring groove. The width of the T-rib controls the angle of play with respect to key element engaging into key slot (e.g., during placement of key element into the key slot). The T-Rib height ensures that the top cover cannot be closed when the T-Rib is not in the right open cavity spot, in other words, the T-Rib ensures that the top cover can only be closed when the filter element is properly installed into the housing (e.g., key element is disposed in the key slot).

The T-Rib feature provides ease of installation of the filter element into the housing. The housing includes a fuel inlet, a fuel outlet, an open cavity disposed 180° opposite the key slot, a water collection sump, and a baseplate. In some arrangements, the baseplate includes the key slot and is structured to connect the housing and the filter element (e.g., that the key element and key slot properly engage). In some arrangements, the baseplate is bolted at four locations to receive the filter element. The T-Rib is structured to only go through the open cavity, and the T-Rib height ensures that the top cover cannot be closed when the T-Rib is not in the open cavity sport. In other words, the height of the T-Rib is such that if improperly disposed (e.g., not in the open cavity), the filter element will protrude from the housing and prevent top cover installation.

Figure 1A:
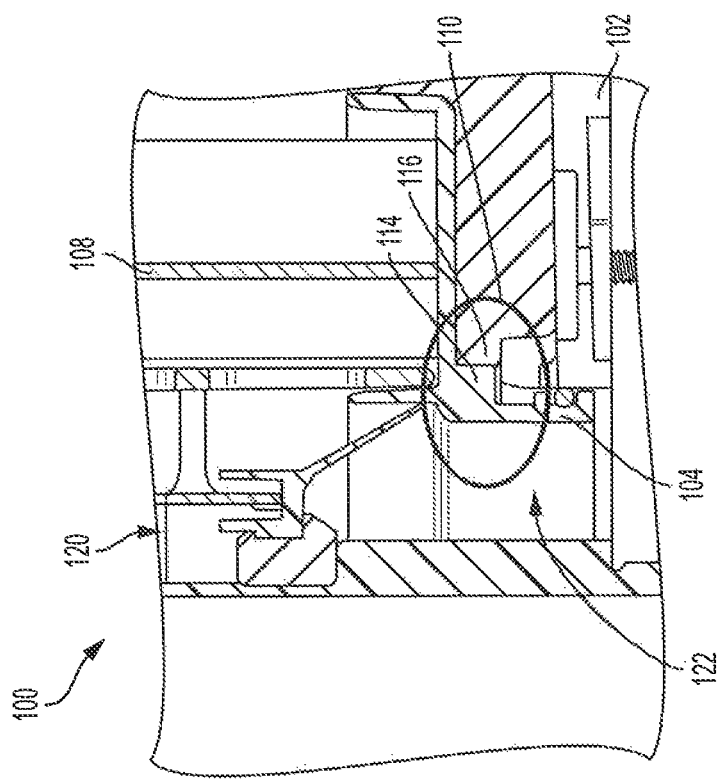
FIG. 1A shows a cross-sectional view of a filtration system that includes a filter element with a key element and a complementary housing with a key slot, according to an example embodiment (e.g., a current filter element).

Referring to FIG. 1A, a portion of a filtration system 100 is shown, according to an example embodiment. The filtration system 100 includes a filter element 120 and housing 122 that have complementary alignment elements. The filter element 120 includes a first endplate 104 with a key element 114 disposed on a bottom end (e.g., the side opposite of the filter media 108). The housing 122 includes a housing baseplate 102 that is disposed in a bottom portion of the housing 122. The housing baseplate 102 includes a key slot 116 that is configured to receive the key element 114 to form the alignment 110. FIG. 1B shows a perspective view of the alignment 110 of the key element 114 of the first endplate 104 and the key slot 116 of the housing baseplate 102. Notably, the filter element 120 and the housing 122 lack a poke yoke feature (or similar alignment feature to ensure that the key element 114 and key slot 116 are properly aligned.

Figure 2:
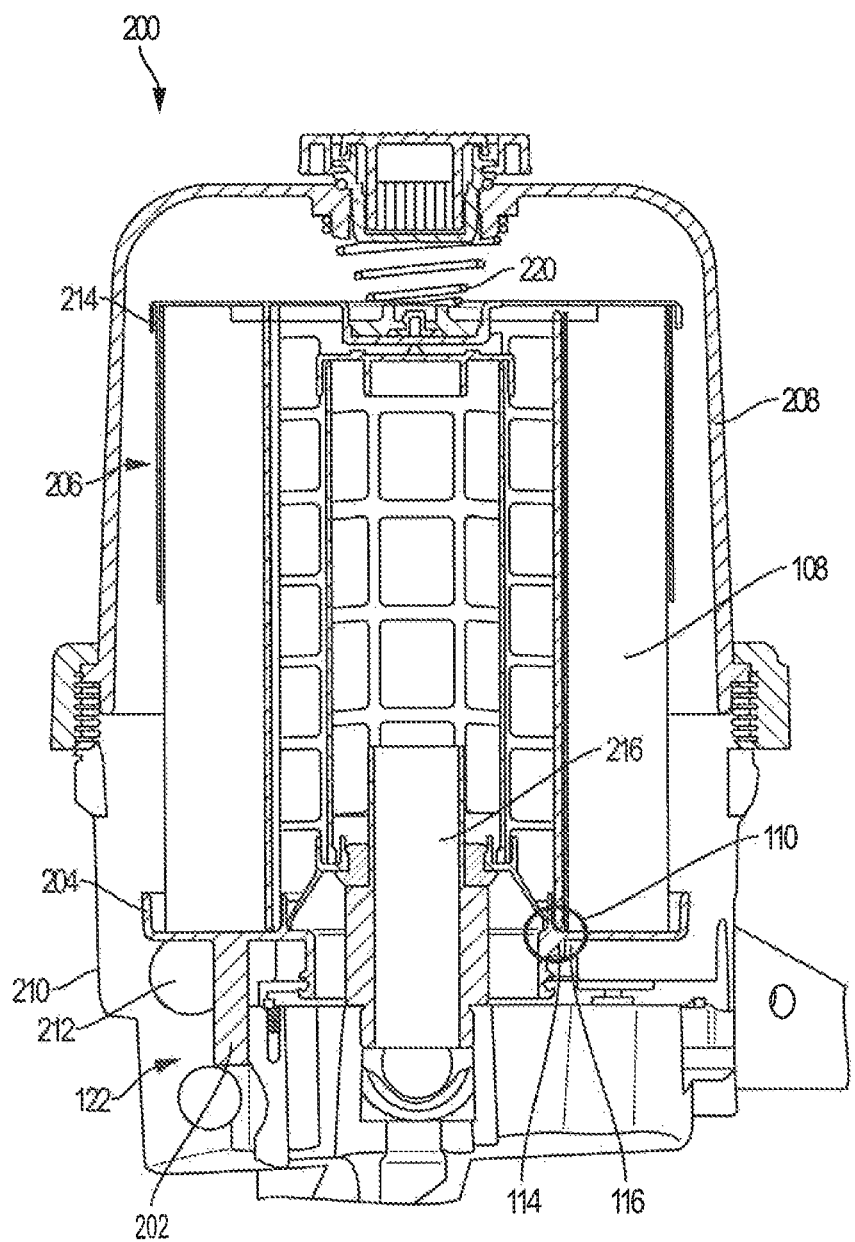
FIG. 2 shows a cross-sectional view of a filtration system including a filter element having an endplate that includes an installation guidance element, according to an example embodiment.

Referring to FIG. 2, a cross-sectional view of a filtration system 200 including a filter element 206 having an endplate 204 that includes an installation guidance element 202 is shown, according to an example embodiment. The filtration system 200 includes a filter element 206, a housing 122, and a spring 220 between the top of the housing 122 and the top of the filter element 206. The filter element 206 includes a first endplate 204, a second endplate 214, and filter media 108 extending axially and disposed between the first endplate 204 and the second endplate 214. The first endplate 204 includes the installation guidance element 202 that is structured to act as poke yoke, guiding the user to properly align the key element 114 into the key slot 116 properly. As shown in FIG. 2, the installation guidance element 202 is located 180° opposite the key element 114 on the first endplate 104, therefore, the installation guidance element 202 is also 180° opposite the key slot 116 and the proper alignment 110 of the two elements. The installation guidance element 202 is configured to be inserted into an open cavity 212 in the bottom cover 210 of the housing 122. The installation guidance element 202 extends axially away from the filter media 108.

The housing 122 includes a top cover 208, a bottom cover 210, a standpipe 216, and housing baseplate 102 disposed in the bottom cover 210. The top cover 208 and the bottom cover 210 are threadingly engaged. The housing baseplate 102 radially extends around a portion of the bottom cover 210, such that an open cavity 212 is formed along a section. This open cavity 212 can receive the installation guidance element 202 and is configured to be the only location where the installation guidance element 202 can be received to allow for the top cover 208 and the bottom cover 210 to properly engage and seal.

Turning to FIG. 3A, a cross-sectional, side view of the filtration system 100 of FIGS. 1A and 1B is shown. The open cavity 212 does not have an installation guidance element 202 disposed in it as the first endplate 104 lacks an installation guidance element 202 or similar feature (as shown by the circle). Conversely, as shown in FIG. 3B, the filtration system 200 of FIG. 2 includes an installation guidance element 202 disposed in the open cavity 212. The installation guidance element 202 of the first endplate 204 provides a poke yoke feature for the alignment 110 of the key element 114 and the key slot 116.

Figure 4:
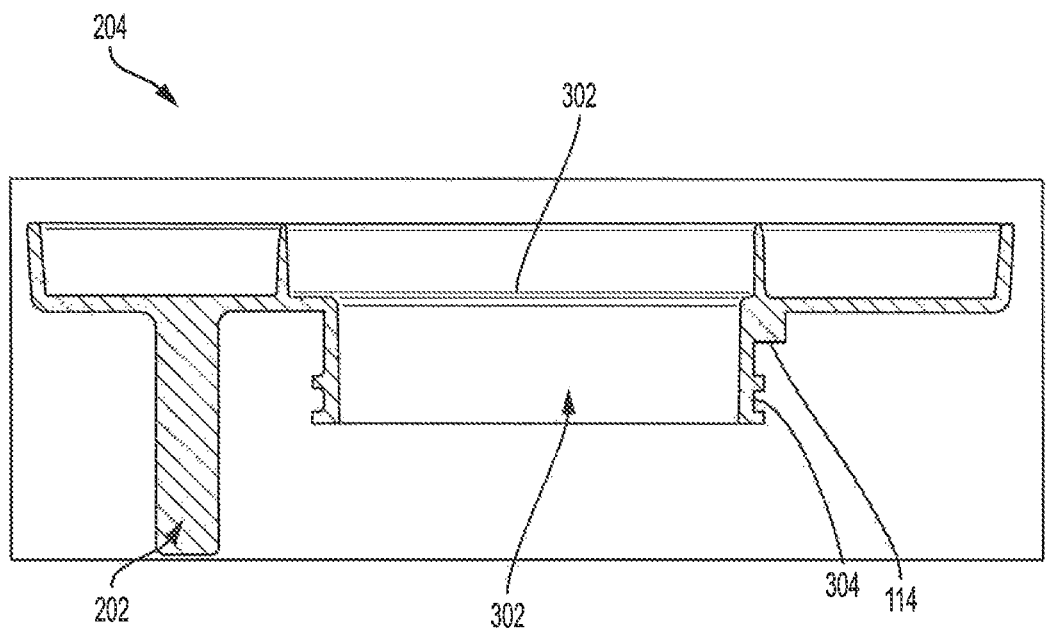
FIG. 4 shows a cross-sectional, side view of the endplate that includes the installation guidance element shown in FIG. 2.

A cross-sectional side view of the first endplate 204 is shown in FIG. 4. The key element 114 is disposed 180° opposite the installation guidance element 202. The first endplate 204 includes a central opening 302 that is offset and includes an O-ring groove 304. The O-ring groove 304 is configured to receive an O-ring or similar sealing member to sealingly engage the first endplate 204 with the housing 122.

Figure 5A:
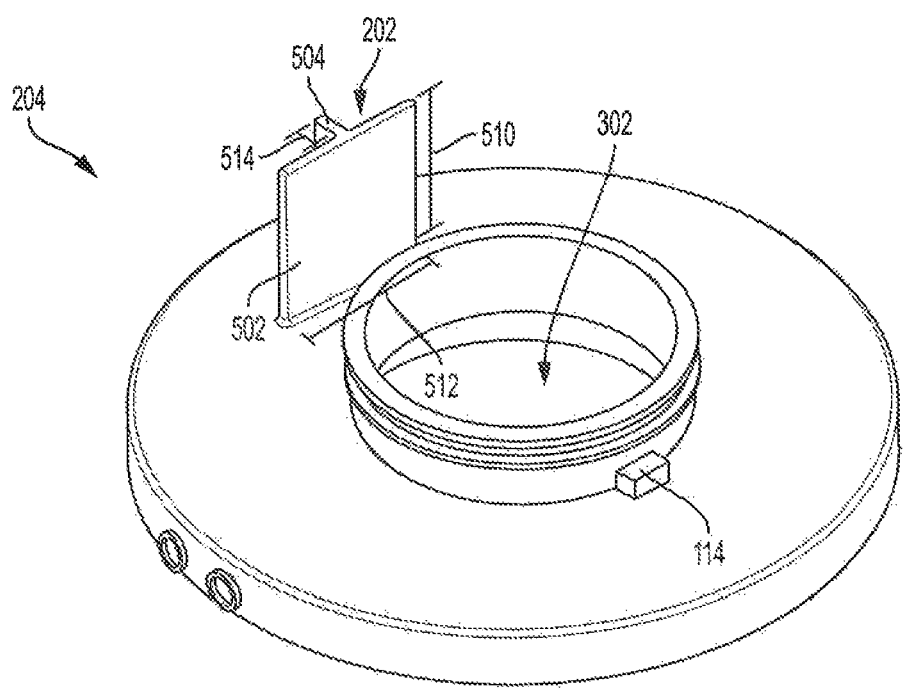
FIG. 5A shows a bottom perspective view of the endplate that includes an installation guidance element shown in FIG. 2.

FIG. 5A shows a bottom perspective view of the first endplate 204 that includes the installation guidance element 202. The installation guidance element 202 comprises a rib formed in a "T" shape and referred to herein as a "T-Rib." The T-Rib installation guidance element 202 includes a protrusion that is "T" shaped having two lateral protrusions 502 (e.g., parallel to the diameter of the first endplate 204) and one longitudinal protrusion 504 (e.g., along a diameter of the first endplate 204) that is perpendicular to the intersection of the two lateral protrusions 502. The two lateral protrusions 502 have a length 512 that is greater than the length 514 of the longitudinal protrusion 504. The two lateral protrusions 502 have a height 510 that is similar to the height 510 the longitudinal protrusion 504. As will be appreciated, the length 512 of the two lateral protrusions 502 (e.g., width of the installation guidance element 202) controls the angle of play with respect to key element 114 engaging into key slot 116 during placement of filter element 206 into the housing 122. The height 510 of the installation guidance element 202 ensures that the top cover 208 cannot be closed when the installation guidance element 202 is installed outside of the open cavity 212 of the housing 122. In other words, the installation guidance element 202 ensures that the top cover 208 can only be closed and engage the bottom cover 210 when the filter element 206 is properly installed into the housing 122 (e.g., key element 114 is disposed in the key slot 116).

Figure 5B:
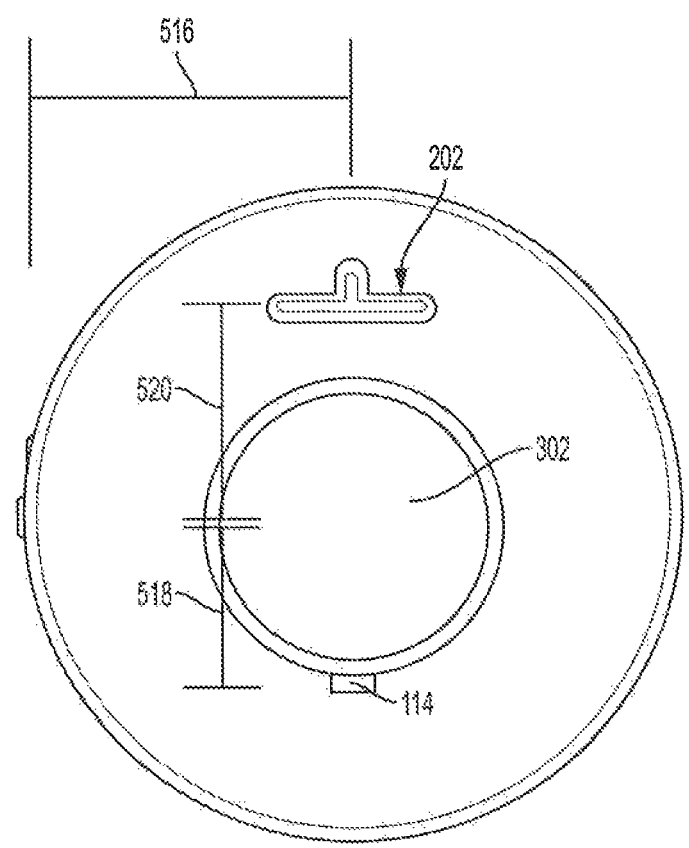
FIG. 5B shows a top view of the installation guidance element of FIG. 5A.

FIG. 5B shows a top view of the first endplate 204 and installation guidance element 202. In some embodiments, the two lateral protrusions 502 have a length 512 of approximately 35 centimeters, and the longitudinal protrusion 504 has a length 514 of approximately 7 centimeters. The width of the two lateral protrusions 502 and the longitudinal protrusion 504 is approximately 2.8 centimeters. The height 510 of the installation guidance element 202 may be in the range of 50 to 70 centimeters. The installation guidance element 202 may be disposed at a distance 516 of approximately 77 centimeters from an edge of the first endplate 204. The installation guidance element 202 may be disposed by a length 520 of approximately 55 centimeters from the center of the central opening 302. The key element 114 may be disposed by a length 518 of approximately 38 centimeters from the center of the central opening 302.

Figure 6B:
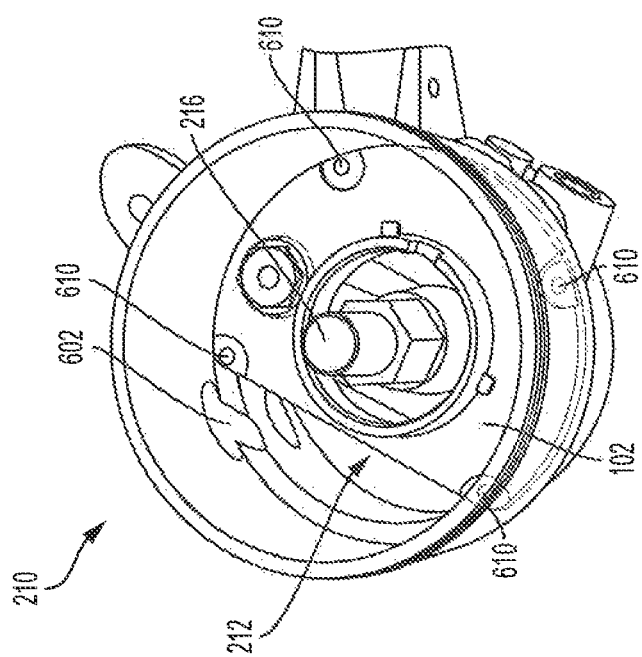
FIG. 6B shows a perspective view of a housing with the baseplate installed.
Figure 6A:
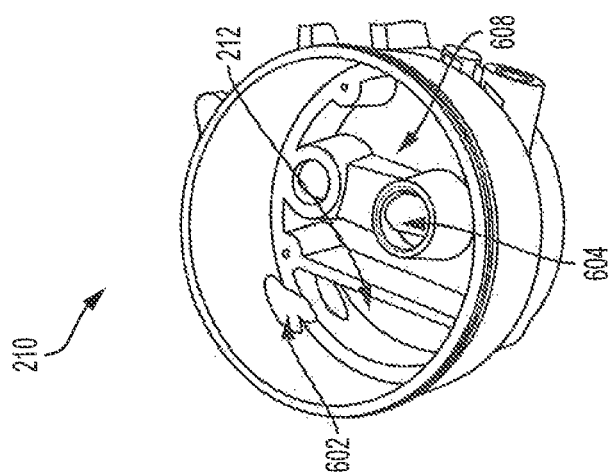
FIG. 6A shows a perspective view of a housing without the baseplate installed.

FIG. 6A shows a perspective view of the bottom cover 210 of the housing 122 without the housing baseplate 102 installed. The bottom cover 210 includes a fuel inlet 602, a fuel outlet 604, and a water collection sump 608. FIG. 6B shows a perspective view of the housing baseplate 102 installed within the bottom cover 210 of FIG. 6A. The housing baseplate 102 is bolted at four locations 610 to engage the housing 122. Once the housing baseplate 102 is installed, the open cavity 212 is formed. As is readily apparent, when the installation guidance element 202 is disposed within the open cavity 212, the installation guidance element 202 will be adjacent to the fuel inlet 602.

Figure 7:
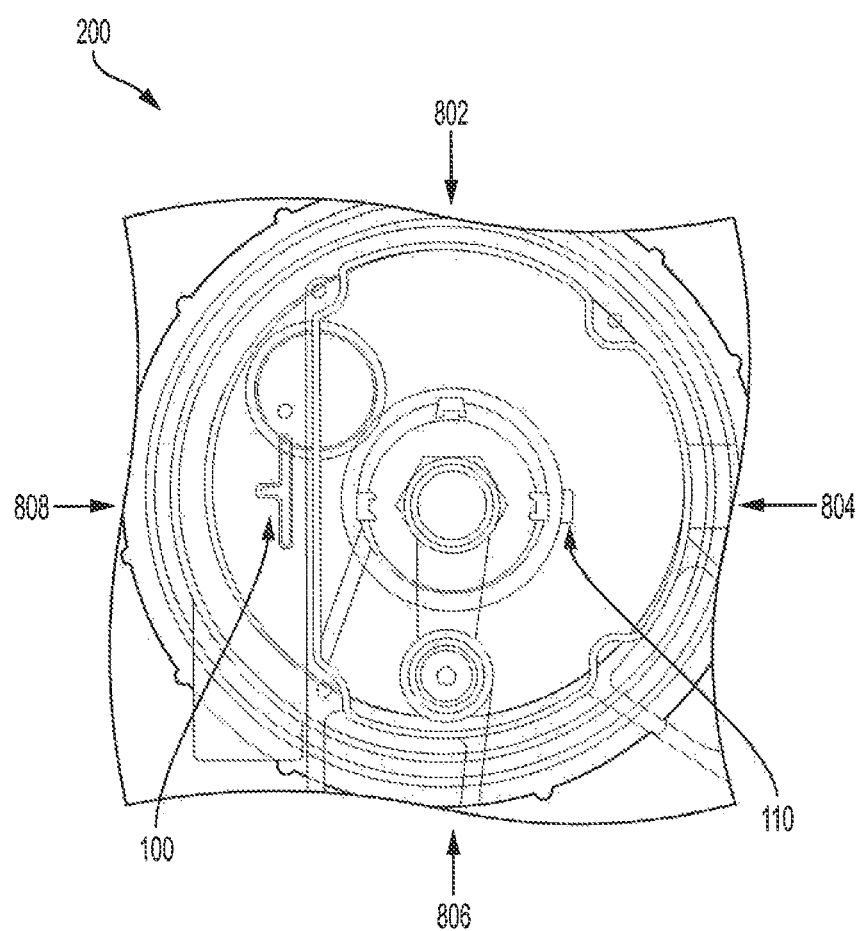
FIG. 7 shows a shows a cross-sectional, top view of proper and improper installation location of a filtration system including a filter element having an endplate that includes an installation guidance element, according to an example embodiment.
Figure 8A:
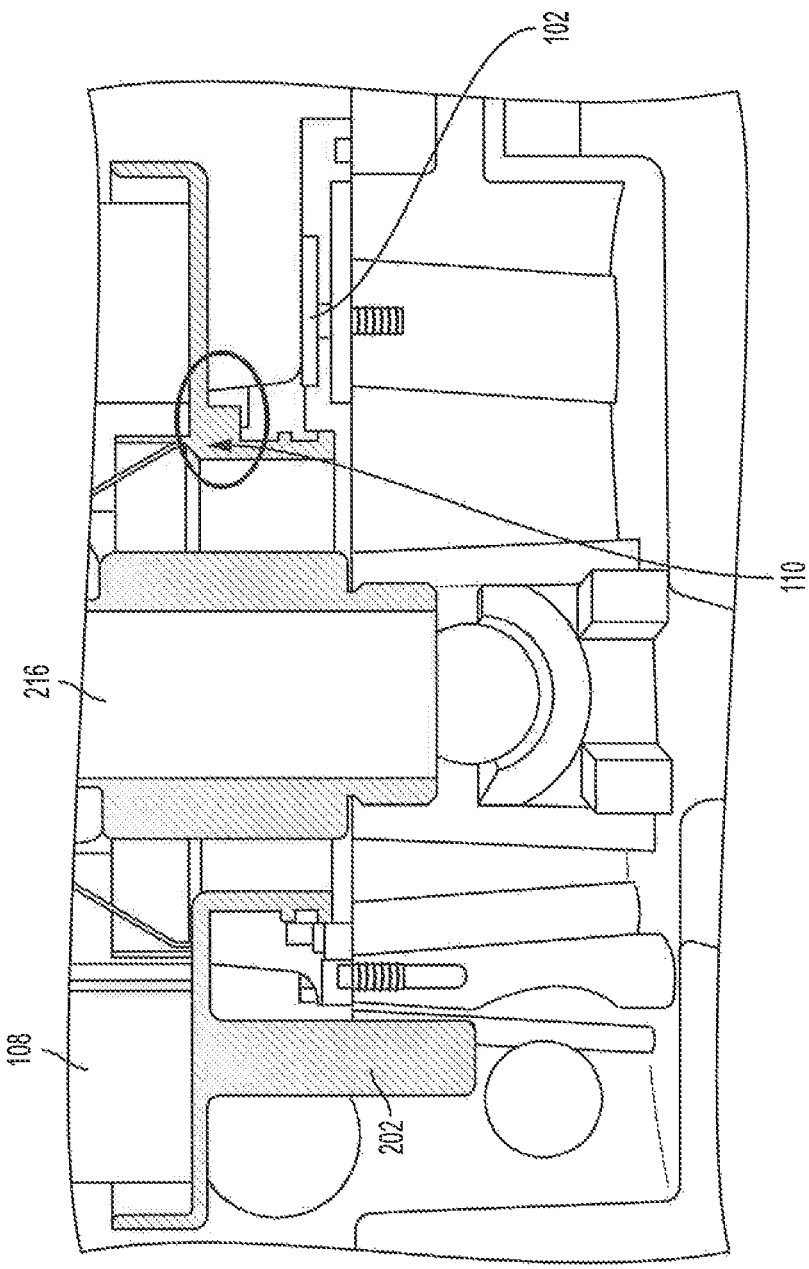
FIG. 8A shows a cross-sectional, side view of a filtration system of FIG. 7 including a filter element having an endplate that includes an installation guidance element that is properly installed.
Figure 8B:
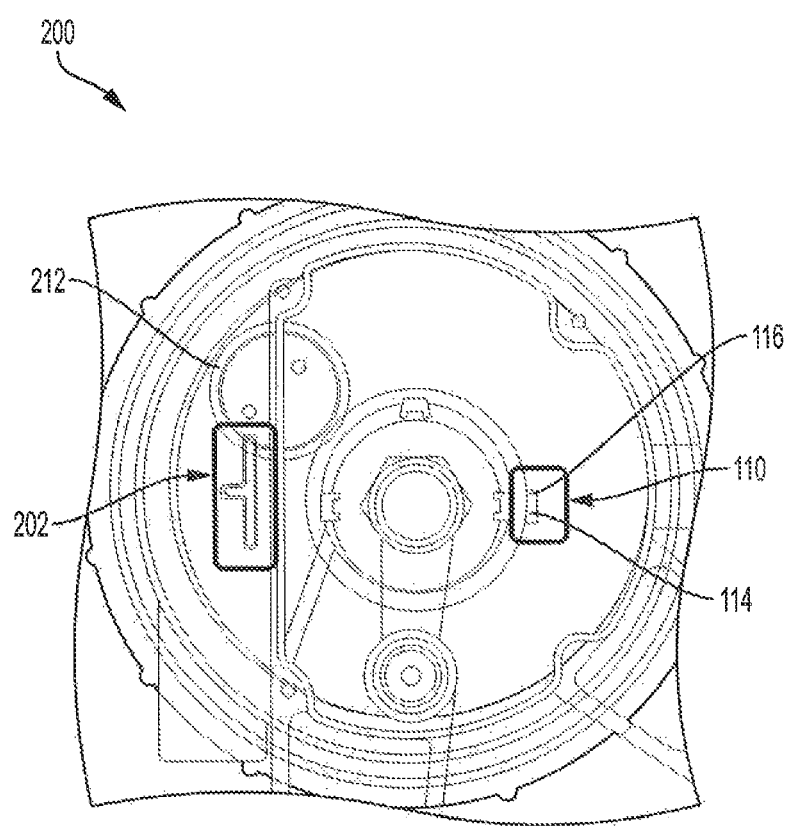
FIG. 8B shows a cross-sectional, top view of a proper installation of a filtration system including a filter element having an endplate that includes an installation guidance element shown that is properly installed at a location of a "9 o'clock" position.
Figure 9A:
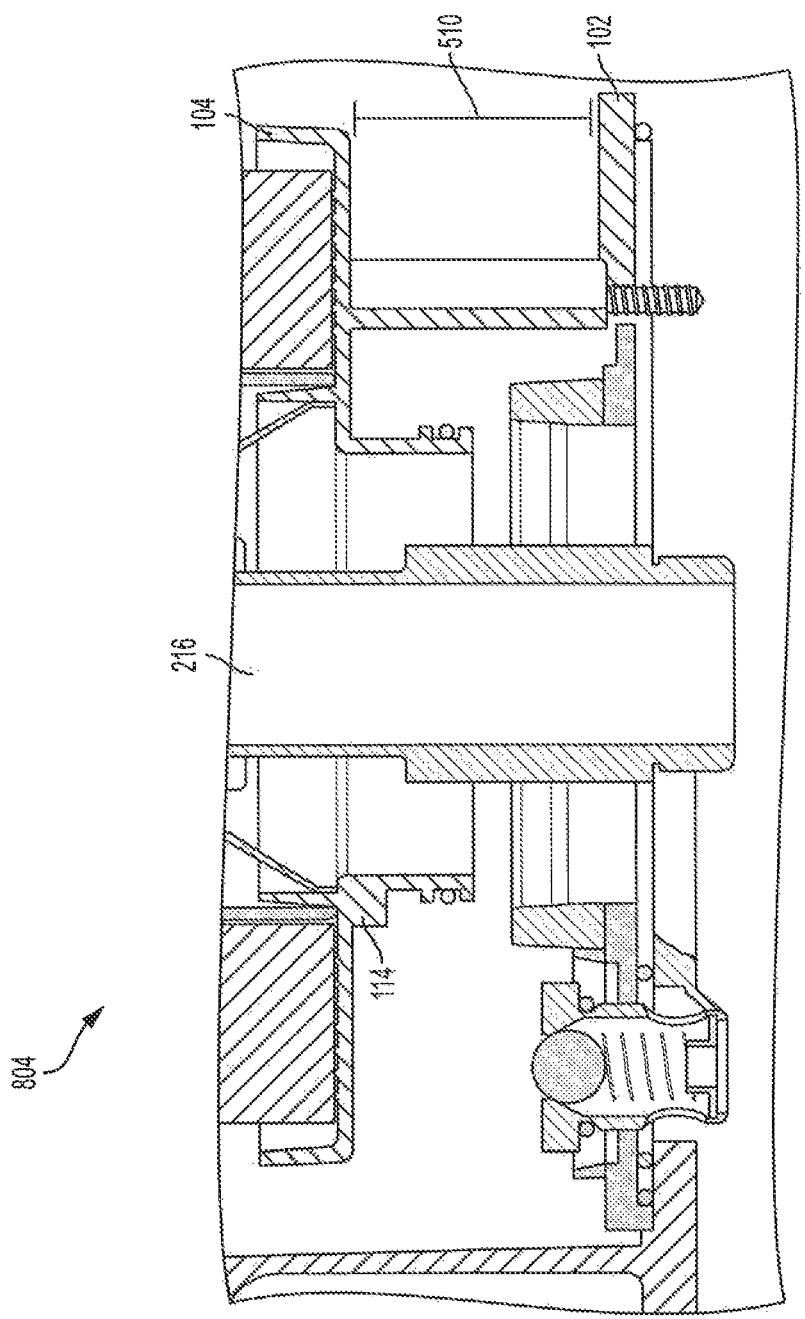
FIG. 9A shows a cross-sectional, side view of a filtration system of FIG. 7 including a filter element having an endplate that includes an installation guidance element that is improperly installed.
Figure 10B:
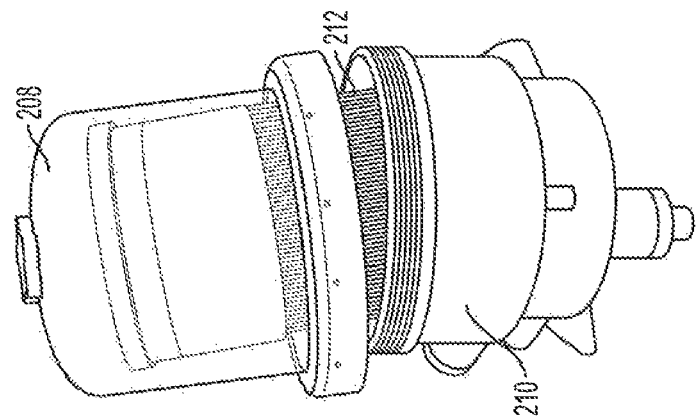
FIG. 10B shows a perspective view of the improper installation of the filtration system including the filter element having the endplate that includes the installation guidance element of FIG. 10A that includes a housing top cover unable to close.
Figure 10A:
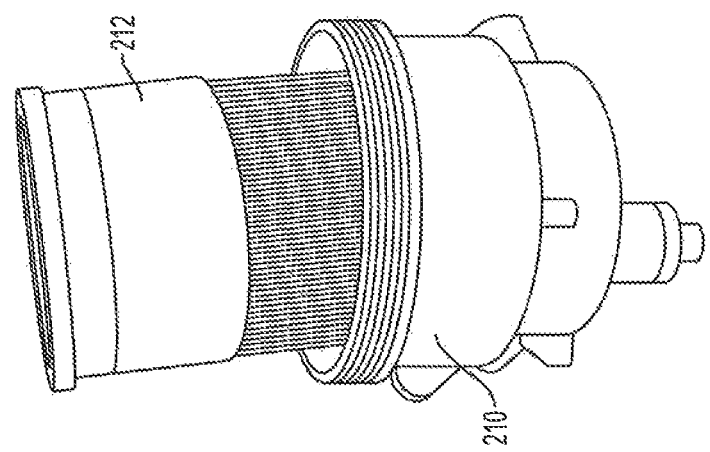
FIG. 10A shows a perspective view of an improper installation of a filtration system including a filter element having an endplate that includes an installation guidance element.

FIG. 7 shows a shows a cross-sectional, top view of proper and improper installation locations of the installation guidance element 202. The housing top cover 208 and bottom cover 210 can properly engage only when the installation guidance element 202 is installed at the "9 O'clock position" 808. The proper installation of the filter element 206 within the housing 122, such that the installation guidance element 202 is disposed in the open cavity 212 is shown in FIGS. 8A-8B. The installation guidance element 202 is improperly installed at the "12 O'clock position" 802, "3 O'clock position" 804, and "6 O'clock position" 806. In other words, the top cover 208 cannot be closed and properly engage the bottom cover 210 because overall height of filter element 206 will increase by the height 510 of installation guidance element 202 at the "12, 3 & 6 O'clock" positions. The improper installation of the filter element 206 within the housing 122, such that the installation guidance element 202 is not disposed in the open cavity 212 is shown in FIGS. 9A-9C. Perspective views of the improper installation of the filter element 206 within the housing 122 and inability to engage the top cover 208 and the bottom cover 210 are shown in FIGS. 10A and 10B.

Expanding on the installation guidance element 202 acting as a poke yoke rib feature, the installation guidance element 202 will ensure proper filter element 206 installation into housing 122 because, if the key element 114 is not aligned with key slot 116, the poke yoke rib feature of the installation guidance element 202 will make the filter element 206 sit uneven in the housing 122 (thereby indicating to the operator something is wrong). The poke yoke rib feature of the installation guidance element 202 ensures difficult or impossible improper installation of the filter element 206 and housing 122. The poke yoke rib feature of installation guidance element 202 also prevents the system from priming due to the fact the top spring is highly compressed and so tight that fuel cannot pass.

In some arrangements, the key element 114 and key slot 116 comprise filter detection devices. For example, the key element 114 may comprise a filter identifier (e.g., RFID, bar code, etc.) and the key slot 116 may comprise a filter ID reader (e.g., RFID reader, bar code scanner, etc.). In some arrangements, the key element 114 and key slot 116 are a magnetic feature location pair. In other arrangements, the key element 114 and key slot 116 are in the form of complementary sealing configurations. For example, the key element 114 is a planar or non-planar (e.g., angled, con- toured, etc.) surface and the key slot 116 is a complementary planar or non-planar surface. In other arrangements, the key element 114 and key slot 116 are flow passages that need to be aligned. For example, the key element 114 is an outlet passage, or disposed on an outlet passage, of the filter element and the key slot 116 is an outlet passage, or disposed on an outlet passage, of the housing. Alternatively, the key element 114 and key slot 116 may be in the form of, or disposed on, an inlet passage, an outlet passage, both the inlet and outlet passages, one or more internal flow passages, or similar passages.

Figure 11:
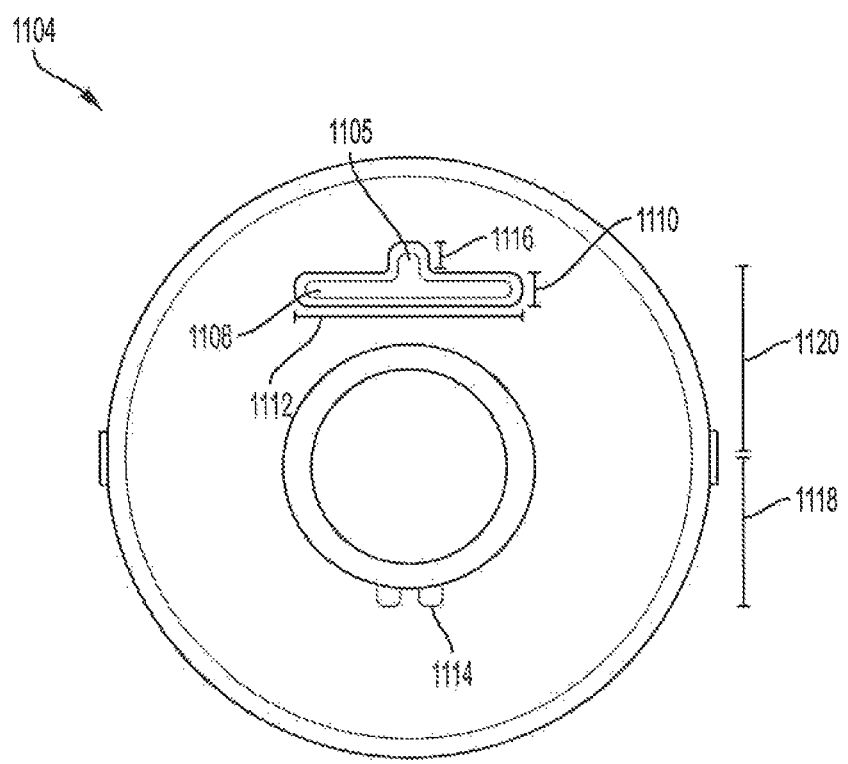
FIG. 11 shows a detailed version of an endplate that includes an installation guidance element, according to another example embodiment.

Turning to FIG. 11, a top view of the first endplate 1104 that includes the installation guidance element 1102 is shown, according to an example embodiment. The installation guidance element 1102 comprises a rib formed in a "T" shape and referred to herein as a "T-Rib." The T-Rib installation guidance element 1102 includes a protrusion that is "T" shaped having two lateral protrusions 1108 (e.g., parallel to the diameter of the first endplate 1104) and one longitudinal protrusion 1106 (e.g., along a diameter of the first endplate 1104) that is perpendicular to the intersection of the two lateral protrusions 1108. The two lateral protrusions 1108 have a length 1112 that is greater than the length 514 of the longitudinal protrusion 1106. The two lateral protrusions 1108 have a height 1110 that is similar to the height 1110 the longitudinal protrusion 1106. As will be appreciated, the length 1112 of the two lateral protrusions 1108 (e.g., width of the installation guidance element 1102) controls the angle of play with respect to key element 1114 engaging into the key slot 116 during placement of filter element 206 into the housing 122. The height 1110 of the installation guidance element 1102 ensures that the top cover 208 cannot be closed when the installation guidance element 1102 is installed outside of the open cavity 212 of the housing 122. In other words, the installation guidance element 1102 ensures that the top cover 208 can only be closed and engage the bottom cover 210 when the filter element 206 is properly installed into the housing 122 (e.g., key element 1114 is disposed in the key slot 116).

As will be appreciated, the first endplate 1104 has a smaller radius that the first endplate 204 of FIG. 5A-5B. Specifically, the radius of the first endplate 204 is approximately 77 centimeters and the radius of the first endplate 1104 is approximately 51 centimeters. In some embodiments, the two lateral protrusions 1108 have a length 1112 of approximately 35 centimeters, and the longitudinal protrusion 1106 has a length 514 of approximately 7 centimeters. The width of the two lateral protrusions 1108 and the longitudinal protrusion 1106 is approximately 2.8 centimeters. The height 1110 of the installation guidance element 1102 may be in the range of 25 to 70 centimeters. The installation guidance element 1102 may be disposed at a distance 1120 of approximately 51 centimeters from an edge of the first endplate 1104. The installation guidance element 1102 may be disposed by a distance 1120 of approximately 55 centimeters from the center of the central opening 302. The key element 1114 may be disposed by a length 1118 of approximately 38 centimeters from the center of the central opening 302. As shown in FIG. 11, the key element 1114 is a dual slotted key element 1114 having two key elements separated by a gap. In some embodiments, the installation guidance element 1102 is larger than the installation guidance element 202. Specifically, the installation guidance element 1102 has a greater length 1112 of the two lateral protrusions 1108 than the length 512 of the two lateral protrusions 502.

Figure 12A:
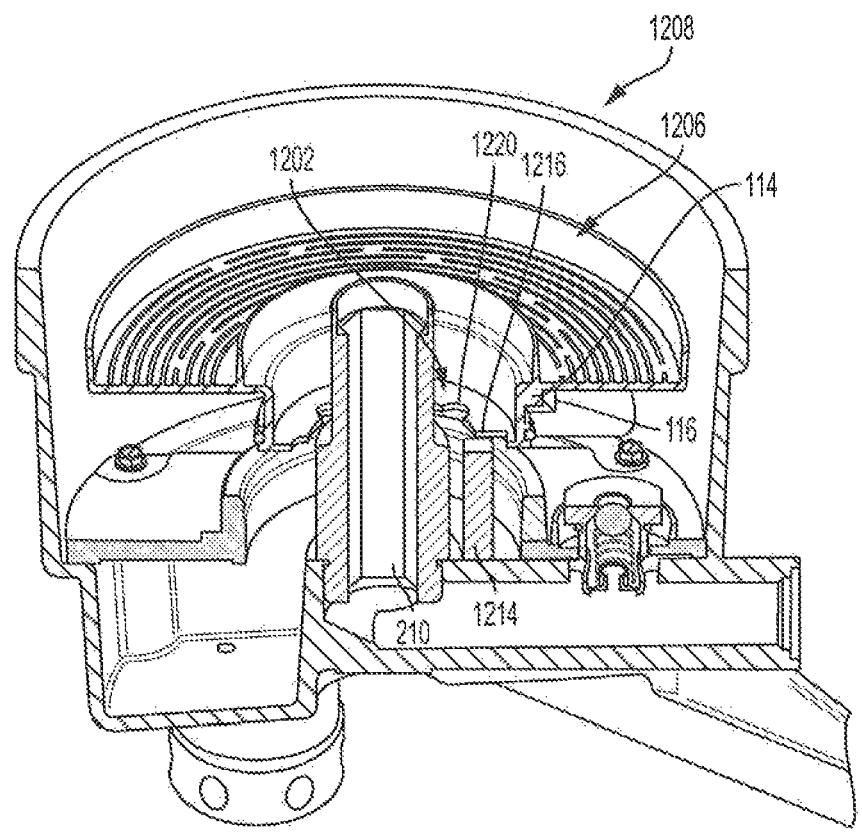
FIG. 12A shows a cross sectional view of a filtration system 1200 that includes an installation guidance element, according to an example embodiment.
Figure 12B:
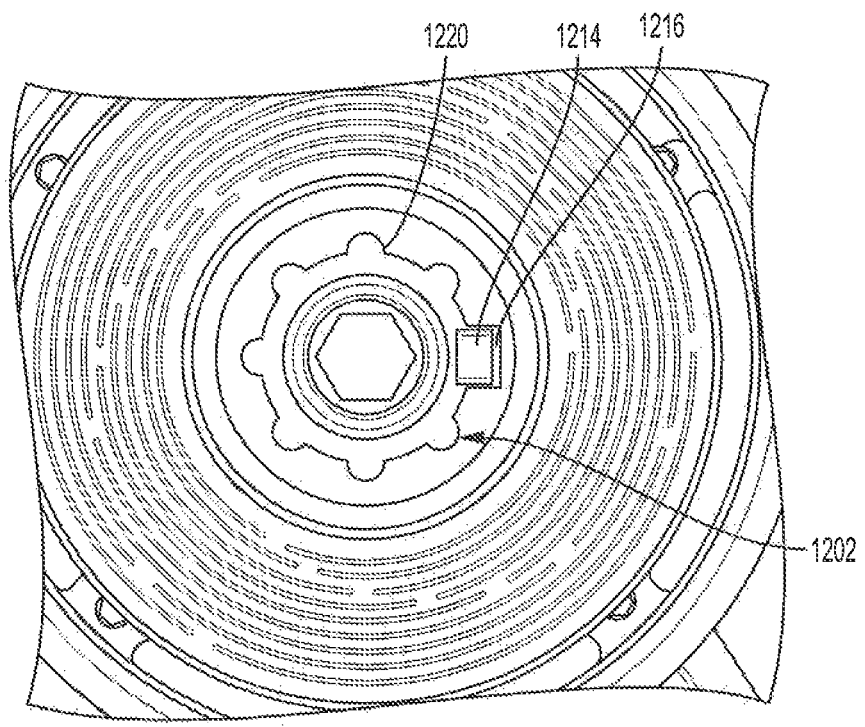
FIG. 12B shows a top view of the filtration system of FIG. 12A.
Figure 12C:
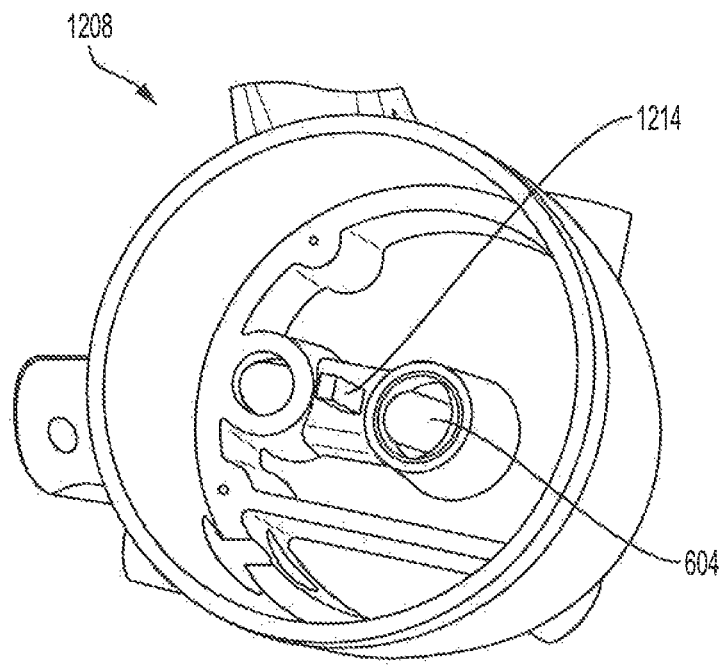
FIG. 12C shows a detailed version of the housing of FIG. 12A.

FIGS. 12A and 12B show a cross sectional view and a top view, respectively, of a filtration system 1200 that includes an installation guidance element 1202, according to an example embodiment. The filtration system 1200 includes a filter element 1206 and housing 1208. The filter element 1206 includes a first endplate 1204 with a key element 114 and installation guidance element 1202. The installation guidance element 1202 is similar to the installation guidance element 202 of FIG. 2. A difference between the installation guidance element 1202 and the installation guidance element 202 is the installation guidance element 1202 includes a plurality of scallops and an endplate key slot 1216 (e.g., internal key slot). The housing 1208 is similar to the housing 122 of FIG. 2. In some embodiments, the installation guidance element 1202 includes a plurality of scallops 1220 that may improve and facilitate water drainage in the filtration system 1200. A difference between the housing 1208 and the housing 122 is the housing 1208 includes a housing key element 1214 to engage the complementary endplate key slot 1216 of the installation guidance element 1202. The housing key element 1214 is a protruding member that extends from the bottom of the housing 1208, axially upward toward the top of the housing 1208. The housing key element 1214 is adjacent to the standpipe 216 and the fuel outlet 604 and is specifically configured to engage a complementary endplate key slot 1216 on the first endplate 1204, as shown in FIG. 12C. In some embodiments, the standpipe 216 includes an internal hexagonal drive.

Figure 12D:
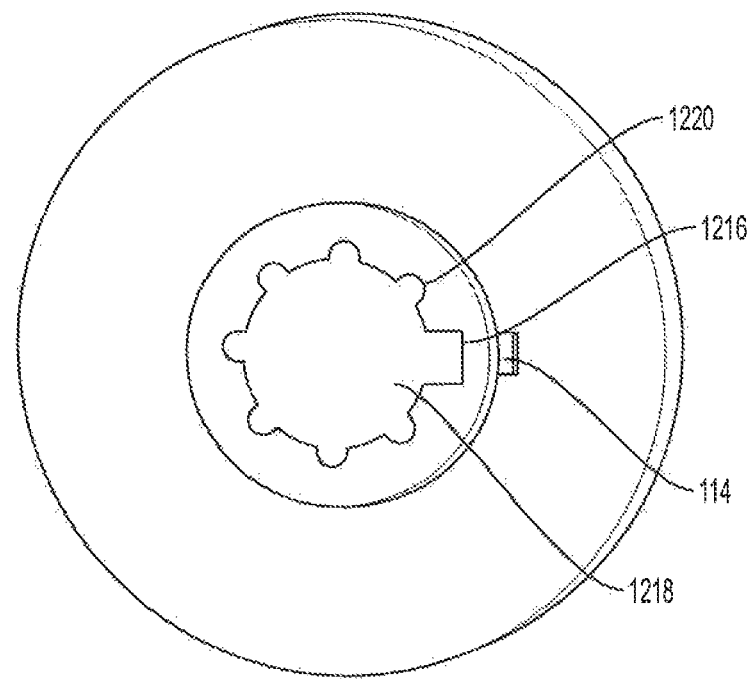
FIG. 12D shows a detailed version of the installation guidance element of FIG. 12A.

Expanding upon the installation guidance element 1202, as shown in FIG. 12D, the endplate key slot 1216 is adjacent to and coplanar with the key element 114. The central opening 1218 of the first endplate 1204 includes a plurality of scallops 1220 that are half-circle openings formed around the central opening 1218. The central opening 1218 also includes the endplate key slot 1216 at a "3 O'clock" location along the central opening 1218. The location ensures that filter element 1206 will have a specific orientation when the filter element 1206 is installed within the housing 1208. Specifically, the first endplate 1204 comes in contact with the bottom of the housing 1208 and is rotated until the housing key element 1214 is disposed within the endplate key slot 1216. At this orientation, the key element 114 of the first endplate 1204 is disposed within the key slot 116 of the housing 1208. Beneficially, the installation guidance element 1202 does not require a housing baseplate in the housing 1208.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:
1. A method, comprising:
providing a housing for a filter element, the housing having a first housing portion and a second housing portion, the housing defining a central compartment therein, the first housing portion comprising:
a housing baseplate,
a key slot, and
a cavity; and
providing a filter element, comprising:
a filter media having a first end and a second end;
an endplate coupled to the first end, the endplate comprising:
a throat extending axially from the endplate away from the filter media and having a first height, a central axis of the throat being radially offset from a longitudinal axis of the filter assembly,
a key element disposed on the endplate and abutting an outside surface of the throat, and
a T-shaped installation guidance element radially offset from the key element and extending from the endplate away from the filter media, the T-shaped installation guidance element comprising a first lateral protrusion, a second lateral protrusion, and a longitudinal protrusion, the longitudinal protrusion perpendicular to an intersection of the first lateral protrusion and the second lateral protrusion, the T-shaped installation guidance element having a second height greater than the first height of the throat; and
positioning the filter element within the first housing portion such that:
if the key element engages the key slot of the housing, and the T-shaped installation guidance element is inserted into the cavity defined at the first housing portion, the second housing portion is engageable with the first housing portion, and
if the T-shaped installation guidance element contacts the housing baseplate, the second housing portion is not engagement with the first housing portion due to the second height of the T-shaped installation guidance element being greater that the first height of the throat, wherein the key element abuts the throat at a location that is 180 degrees opposite a location of the T-shaped installation guidance element so as to provide a poka yoke feature for proper installation of the filter element within the housing.

2. The method of claim 1, wherein the first lateral protrusion and the second lateral protrusion are structured to have a length so as to control an angle of play with respect to the key element engaging the key slot of the housing during installation of the filter element within the housing.

3. The method of claim 1, wherein the T-shaped installation guidance element is structured to have a height such that a top cover of the housing cannot be closed when the T-shaped installation guidance element is disposed outside of the cavity.

4. The method of claim 1, wherein the endplate defines an opening, the throat extending from an inner circumferential surface of the opening.

5. The method of claim 1, wherein a length of the first lateral protrusion and the second lateral protrusion is greater than a length of the longitudinal protrusion.

6. The method claim 1, wherein:
the endplate is a first endplate, and
the filter element further comprises a second endplate coupled to the second end of the filter element opposite the first end, the second endplate being closed.

7. The method of claim 1, wherein:
a central channel is defined and extends axially through the filter media, and
the filter element further comprises an inner filter element disposed within the central channel.

* * * * *